Patented Feb. 27, 1940

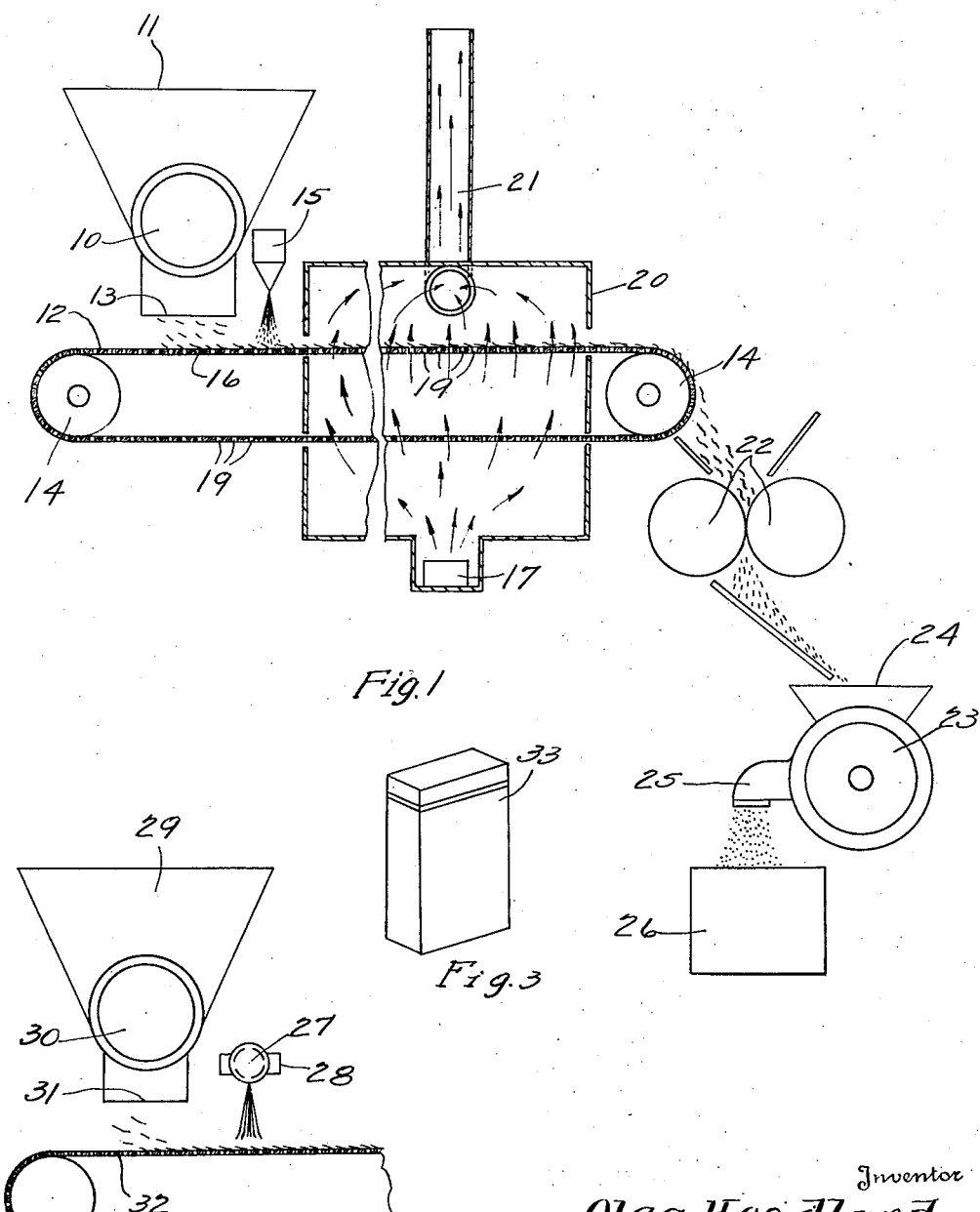

2,192,041

UNITED STATES PATENT OFFICE 2,192,041

METHOD OF TREATING AND PREPARING VEGETABLES

Olga Headland, Moorhead, Minn.

Application June 7, 1938, Serial No. 212,282

2 Claims. (Cl. 99—204)

My invention relates to an improvement in method of treating and preparing vegetables and fruits wherein it is desired to produce vegetables and fruits in granulated form which have been sweetened and seasoned and in which the moisture has been removed.

For many years attempts have been made to dry vegetables and to grind the same to powder form in order to make them more readily marketable and to concentrate the same. These methods, however, have consisted in cutting the vegetables into small pieces, drying the same, and in grinding the dried vegetables to a powder. This powder is nothing more or less than concentrated vegetables and includes for the main part no artificial sweetening or flavoring. If it has been found desirable to sweeten or further flavor these vegetables in powder form, this has been done after the vegetables have been ground by mixing the same with sugar or other sweetening means.

It is a purpose of the present invention to produce a product which comprises vegetables and fruits in granulated form which vegetables and fruits have been seasoned, sweetened, or both, during the process and which therefore taste more natural than would be the case if these vegetables were sweetened after the process has been completed. The present product is accordingly felt to be a decided improvement over prior methods which are thought to be limited to certain vegetables such as squash, pumpkin, and other similar vegetables.

It is a purpose of my invention to provide a process capable of producing a dried fruit or vegetable product which is edible in the form produced and which may be merchandized as a confection or the like. This differs from former methods which are designed to create dried pumpkin flour or squash flour which may be used for preparing food products but which are not readily palatable in the form produced.

It is a purpose of my invention to provide a dried fruit or vegetable product, the fruits or vegetables forming which are seasoned and sweetened before the drying process. This feature is extremely important as by this means the fruit or vegetable may be more intimately combined with the sweetening material during the drying process. The heat necessary to dry the vegetables acts to heat the sweetening material with the vegetables, thereby causing the fruit and vegetables to be thoroughly saturated with the sweetening material. Thus every particle of the finished product is sweetened as the material as a whole is sweetened before being granulated.

It is a further feature of my invention to provide an apparatus for accomplishing my method which comprises a slicing mechanism, a sweetening mechanism for sprinkling or spraying sweetening material and seasoning material upon the sliced fruit or vegetables, an endless belt which is perforated in such a manner to permit the heat to pass through the same and to thereby dry vegetables and fruits resting thereupon, a rolling mechanism to crush the fruits or vegetables after the drying process, and a grinding mechanism for grinding the product into granulated form.

These and other objects and novel features of my invention will be more clearly and fully set forth in the following specification and claims.

In the drawing forming a part of my specification:

Figure 1 is a diagrammatic view of my apparatus for processing vegetables.

Figure 2 is a view similar to a portion of Figure 1 showing a slight modification of the process of Figure 1.

Figure 3 illustrates the product of my method after it has been packaged.

In accomplishing my method, it is first desirable to obtain the fruits or vegetables in a strictly fresh or in a crisp state. The vegetables are first cut into extremely thin slices which are actually preferably as thin as ordinary paper. These vegetables are then sprinkled lightly with sugar or honey or are sprayed with liquid honey or other sweetening material such as syrup products. The slices are also seasoned with salt, pepper, and other seasoning material if it is desired. The vegetables or fruits thus treated are then heated until they are brittle or dry. The brittle slices of vegetables are then passed through a roller which breaks the same up into small particles and these particles are then ground into granulated form by a suitable grinding mechanism.

The following vegetables are particularly adapted for preparation through my process: carrots, beets, beans, peas, turnips, spinach, parsnips, cabbage, cauliflower, rutabaga, and celery. Fruits which are particularly adapted for preparation by my process are: apples, peaches, and pears.

The method as previously outlined may be accomplished on the apparatus illustrated in Figure 1 of the drawing. Figure 1 illustrates a slicing device 10 having a hopper 11 designed to contain the vegetables and to deposit them upon a belt 12 after passing through the outlet 13. The vegetables may pass directly onto the belt 12 or may be dropped upon a preparing table so that the vegetables and fruits may be treated with a sweetening means while either on the belt 12 or on a preparing table. The figures illustrate the vegetables being dropped directly upon the endless belt 12 supported by supporting rollers 14, and a sweetening and seasoning device 15 is supported over the path of movement of these fruits or vegetables to sprinkle material such as sugar or honey, seasoning, or similar material upon the thin slices 16 of vegetables. After the sweetening of the fruits has taken place, the belt draws these fruits and vegetables over a heating apparatus 17. The heat is created by this heating element 17 and passes upwardly through perforations 19 in the belt 12, thus coming into intimate contact with the sweetened slices 16. The heat is preferably confined by means of an enclosure 20 or oven having a suitable outlet 21 if it is desired. The sweetened and seasoned slices are thoroughly dried by heat created by the element 17.

During the heating and drying process, the sweetening material and seasoning are heated simultaneously with the slices of vegetable or fruit, and this heating tends to cause the sweetening means and seasoning to permeate thoroughly the slices 16. In other words, the sweetening means is in reality cooked into the slices of fruits or vegetables during the drying process, and thereby forms an integral part of these slices.

After the slices 16 have been thoroughly dried and sweetened by the heating and drying process, the slices of vegetables are crushed by a roller means 22. In the form shown, a pair of opposed rollers are provided between which the sliced material passes. If it is desired, however, a single roller may be provided which cooperates with a fixed plate or bearing to thoroughly crush the material into small sweetened particles.

The particles leaving the crushing rollers 22 pass into a grinder 23 having a receiving hopper 24, which grinding device granulates the small particles of sweetened and dried fruits and vegetables and permits them to be expelled through a suitable outlet 25 into a receiving receptacle 26.

In Figure 2 of the drawing, I illustrate a method entirely similar to that previously described, but including a spraying device 27 for spraying sweetening material upon the slices of fruits or vegetables to be dried. This sweetening material ordinarily may be more readily sprayed if preheated. A heating element 28 is provided to permit the slices to be sprayed with heated honey or syrup for example. The fruits or vegetables are placed into the hopper 29 of the slicer 30 and dropped through the outlet 31 onto a belt 32 which moves these slices beneath the spray 27, which sprays the slices with sweetening material and seasoning if desired. This material may be in the form of a syrup of any desired type, or may be liquid honey. Corn syrups are particularly suitable for my purpose although other types may also be readily used.

After the product has been deposited in the receptacle 26, it is packaged in air-tight containers 33, as illustrated in Figure 3 of the drawing. The contents are thus held from receiving moisture from the air by means of the air-tight container in which the material is packed.

It will be seen that my method enables me to produce a product which is edible in finished form and which in reality forms a confection which is not only healthful but also contains nutrition. Persons who do not care particularly for some type of vegetables often find my products pleasing in taste due to the drying and sweetening process to which the fruits and vegetables are subjected.

In drying the vegetables the vitamins contained in the fruits or vegetables prepared remain in the substance and the product is therefore of high vitamin concentration. A small amount of this food product will thus have the food value of a considerable amount of unprepared vegetables or fruits.

In accordance with the patent statues, I have described the principles of my method of treating and preparing vegetables and fruits; and while I have endeavored to set forth the best embodiments thereof, I desire to have it understood that this is only illustrative of a means of carrying out my invention, and that obvious changes may be made within the scope of the following claims without departing from the spirit of my invention.

I claim

1. A process for treating fruits and vegetables consisting in slicing the fruits and vegetables, heating a liquid seasoning and sweetening means, seasoning and sweetening the sliced fruits and vegetables by spraying the heated liquid thereupon, heating the sweetened and seasoned slices to dry the same, and granulating the dried slices.

2. A process for treating fruits and vegetables consisting in slicing the fruits and vegetables into thin slices, heating liquid sweetening means, spraying the heated sweetening means on the sliced vegetables, heating the slices to dry the same, and granulating the dried slices.

OLGA HEADLAND.